United States Patent
Busse et al.

(10) Patent No.: US 12,030,491 B2
(45) Date of Patent: Jul. 9, 2024

(54) ASCERTAINING A TRAJECTORY FOR A FIRST VEHICLE WHILE TAKING INTO CONSIDERATION THE DRIVE BEHAVIOR OF A SECOND VEHICLE

(71) Applicant: ZF Friedrichshafen AG, Friedrichshafen (DE)

(72) Inventors: Timon Busse, Munich (DE); Pietro Pelizzari, Milan (IT)

(73) Assignee: ZF Friedrichshafen AG, Friedrichshafen (DE)

( * ) Notice: Subject to any disclaimer, the term of this patent is extended or adjusted under 35 U.S.C. 154(b) by 235 days.

(21) Appl. No.: 17/778,140

(22) PCT Filed: Nov. 20, 2019

(86) PCT No.: PCT/EP2019/081869
§ 371 (c)(1),
(2) Date: May 19, 2022

(87) PCT Pub. No.: WO2021/098956
PCT Pub. Date: May 27, 2021

(65) Prior Publication Data
US 2022/0410889 A1 Dec. 29, 2022

(51) Int. Cl.
*B60W 30/14* (2006.01)
*B60W 40/04* (2006.01)
(Continued)

(52) U.S. Cl.
CPC .......... *B60W 30/143* (2013.01); *B60W 40/04* (2013.01); *B60W 40/105* (2013.01);
(Continued)

(58) Field of Classification Search
CPC ....... B60W 2420/408; B60W 2552/15; B60W 2552/20; B60W 2552/30;
(Continued)

(56) References Cited

U.S. PATENT DOCUMENTS 10,449,967 B1 * 10/2019 Ferguson ............. G08G 1/0129
10,475,338 B1 * 11/2019 Noel .................... G08G 1/0175
(Continued)

FOREIGN PATENT DOCUMENTS

DE 102011002275 A1 10/2012

OTHER PUBLICATIONS

International Search Report (English Translation) PCT/EP2019/081869, dated Aug. 17, 2020. (2 pages).
(Continued)

*Primary Examiner* — Tyler J Lee
(74) *Attorney, Agent, or Firm* — Dority & Manning, P.A.

(57) ABSTRACT

A processor unit (3) is configured for accessing speed data of a second vehicle (18), the speed data generated by a sensor of a first vehicle (1). The processor unit is also configured for creating a driving behavior profile of the second vehicle (18) based on the speed data and making a prediction about the future driving behavior of the second vehicle (18) based on the driving behavior profile of the second vehicle (18). Moreover, the processor unit is configured for determining a trajectory for the first vehicle (1) by executing an MPC algorithm, which includes a longitudinal dynamic model of the first vehicle and a cost function, such that the cost function is minimized. The prediction about the future driving behavior of the second vehicle (18) is taken into account in the determination of the trajectory.

10 Claims, 2 Drawing Sheets

(51) Int. Cl.
*B60W 40/10* (2012.01)
*B60W 40/105* (2012.01)
*B60W 50/00* (2006.01)

(52) U.S. Cl.
CPC ... *B60W 50/0097* (2013.01); *B60W 2420/408* (2024.01); *B60W 2554/4042* (2020.02); *B60W 2554/4046* (2020.02); *B60W 2555/60* (2020.02)

(58) Field of Classification Search
CPC . B60W 2554/4042; B60W 2554/4046; B60W 2555/60; B60W 2556/50; B60W 2720/103; B60W 30/143; B60W 40/04; B60W 40/105; B60W 50/0097
See application file for complete search history.

(56) References Cited

U.S. PATENT DOCUMENTS

| | | | | |
|---|---|---|---|---|
| 10,860,025 | B2* | 12/2020 | Cunningham | G05D 1/0246 |
| 11,208,103 | B2* | 12/2021 | Oguro | G05D 1/0088 |
| 11,322,018 | B2* | 5/2022 | Julian | G06V 20/56 |
| 2013/0204505 | A1* | 8/2013 | Sauer | B60K 31/00 701/96 |
| 2019/0272744 | A1* | 9/2019 | Suzuki | G08G 1/096758 |
| 2019/0276020 | A1* | 9/2019 | Kanoh | B60W 30/182 |
| 2019/0354105 | A1* | 11/2019 | Cunningham | G05D 1/0246 |
| 2019/0375403 | A1* | 12/2019 | Hu | B60W 30/165 |
| 2020/0058218 | A1* | 2/2020 | Julian | G08G 1/04 |
| 2020/0086869 | A1* | 3/2020 | Oguro | G05D 1/0088 |

OTHER PUBLICATIONS

Liu, Chang et al., "Path Planning for Autonomous Vehicles using Model Predictive Control", 2017 IEEE Intelligent Vehicles Symposium (IV), Redondo Beach, CA, USA, Jun. 2017, pp. 174-179 DOI: 10.1109/IVS.2017.7995716.

Zhou, Bingyu et al. "Joint Multi-Policy Behavior Estimation and Receding-Horizon Trajectory Planning for Automated Urban Driving", 2018 IEEE International Conference on Robotics and Automation (ICRA), Brisbane, Australia, May 2018, pp. 2388-2394 DOI: 10.1109/ICRA.2018.8461138.

* cited by examiner

ASCERTAINING A TRAJECTORY FOR A FIRST VEHICLE WHILE TAKING INTO CONSIDERATION THE DRIVE BEHAVIOR OF A SECOND VEHICLE

CROSS-REFERENCE TO RELATED APPLICATION

The present application is a U.S. national phase of PCT/EP2019/081869 filed in the European Patent Office on Nov. 20, 2019, which is incorporated by reference in its entirety for all purposes.

FIELD OF THE INVENTION

The invention relates generally to the determination of a trajectory for a first vehicle under consideration of the driving behavior of a second vehicle, wherein the second vehicle is traveling ahead of the first vehicle.

BACKGROUND

It is known with respect to adaptive cruise control (ACC) to also take efficiency criteria into account in the planning of speed trajectories. A rapidly growing approach in this regard is trajectory planning with the aid of an MPC solver. In this approach, a plurality of possible trajectories across a virtual horizon is evaluated with respect to overall efficiency of the possible trajectories. In this connection, other road users can also exert an influence on the overall efficiency of the finally selected trajectory. This is the case, for example, when a preceding vehicle initiates a braking operation or travels more slowly and, as a result, reduces the solution space of the MPC solver of the ego vehicle, which is why the ego vehicle is forced onto a less optimal trajectory. A basic problem in this connection is that it is generally not known to the ego vehicle how a preceding vehicle will behave.

SUMMARY OF THE INVENTION

Example aspects of the present invention provide an MPC for a first motor vehicle, wherein the behavior of a second motor vehicle, which is traveling ahead of the first vehicle, is taken into account.

Example aspects of the present invention provide a profiling of a preceding vehicle with respect to driving behavior of the preceding vehicle and a subsequent utilization of the driver profile to implement a driver assistance function. A profiling logic of this type for preceding vehicles can be combined with an MPC-based driving strategy. A profiling of a preceding vehicle can be carried out with reference to radar data and, thereafter, the driver profile can be utilized to optimize a longitudinal-automated driver assistance function. Example aspects of the present invention therefore enables a prediction with respect to the behavior of the preceding vehicle.

In this sense, according to a first example aspect of the invention, a processor unit for a first vehicle is provided. The processor unit is configured for determining a trajectory for a first vehicle under consideration of the driving behavior of a second vehicle, wherein the second vehicle is traveling ahead of the first vehicle (ego vehicle). The second vehicle, therefore, is a preceding vehicle with respect to the first vehicle. The feature "trajectory for the first vehicle" can be understood to be a path that the first vehicle is to follow in the future, for example, within the next few seconds. A speed profile can be associated with the path, wherein the speed profile can predefine a target speed for the first vehicle for each point along the path. This assignment made up of path and speed yields the speed trajectory of the first vehicle.

The processor unit is configured for accessing speed data of the second vehicle, wherein the speed data have been generated by a sensor of the first vehicle. The speed data describe at least one speed at which the second vehicle moves. The speed can be a temporal sequence of the speed at which the second vehicle moves in a determinable time period. The sensor of the first vehicle is configured, in particular, for detecting the speed of the second vehicle. The sensor can be, for example, a radar sensor.

A profile of the driving behavior of the second vehicle can be created with the information that is gathered. For example, vehicles that, on average, stay considerably below a legally permitted maximum speed can be profiled as less aggressive road users. In this sense, the processor unit is configured for creating a driving behavior profile of the second vehicle based on the speed data.

According to example aspects of the present invention, the driving behavior profile of the second vehicle is utilized to create a driving prediction of the profiled vehicle. In this sense, the processor unit is configured for making a prediction about the future driving behavior of the second vehicle based on the driving behavior profile of the second vehicle.

The formulated prediction can be transmitted to an MPC logic for planning an optimal driving trajectory of the first vehicle. The MPC logic plans, under consideration of the route topology, the traffic, and further surroundings information, an optimal speed trajectory for the first vehicle for the upcoming route section. This speed trajectory can now be refined and, as a result, improved under consideration of the prediction with respect to the preceding vehicle. In this way, an integrated optimization of various degrees of freedom is also possible, which results in driving behavior that is optimal as a whole. The prediction with respect to the preceding vehicle can be specified to the MPC logic as a hard constraint. A hard constraint can be understood as a constraint that absolutely must be observed in the determination of the trajectory for the first vehicle. In this sense, the processor unit is also configured for determining a trajectory for the first vehicle by executing an MPC algorithm, which includes a longitudinal dynamic model of the first vehicle and a cost function to be minimized, such that the cost function is minimized, wherein the prediction about the future driving behavior of the second vehicle is taken into account in the determination of the trajectory.

The method of model predictive control (MPC) makes it possible to find, in any situation under established marginal conditions and constraints, an optimal solution for a "driving efficiency" driving function, which provides an efficient driving style. The MPC method is based on a system model, in example aspects of the present invention on a longitudinal dynamic model of the first vehicle, which describes the behavior of the system. In addition, the MPC method is based on an objective function or on a cost function that describes an optimization problem and determines which state variables are to be minimized.

The longitudinal dynamic model can represent a drive train of the motor vehicle and include a vehicle model with vehicle parameters and drive train losses (in part, approximated characteristic maps). In addition, findings regarding upcoming route topographies (for example, curves and uphill grades) can be incorporated into the longitudinal dynamic model of the drive train. In addition, findings regarding speed limits on the upcoming route can also be incorporated into the dynamic model of the drive train. The MPC algorithm can include an MPC solver in the form of a software module. The MPC solver can include instructions or program code, as the result of which the processor unit is instructed to determine—as a function of the longitudinal dynamic model of the first vehicle—the trajectory of the first vehicle such that the cost function is minimized.

The processor unit can transmit the optimized trajectory of the first vehicle to a software module ("target generator"). By this software module, the processor unit can convert the mathematically optimal planning of all available degrees of freedom into actually evaluatable component signals. By way of example, a speed trajectory of the first vehicle for the next five thousand meters (5000 m) can be optimally planned by the MPC. In this case, the target generator would "convert" the first (=actually necessary) speed value of this trajectory, for example, into a demand torque of an electric machine (as an efficiency-relevant component) of the first vehicle. The component software can then operate with this value and regulate the intended speed.

According to one further example embodiment, a first term of the cost function includes an electrical energy weighted with a first weighting factor and predicted according to the dynamic model, which is provided within a prediction horizon by a battery of the drive train of the first vehicle for driving the electric machine. In addition, the cost function can include, as a second term, a driving time weighted with a second weighting factor and predicted according to the longitudinal dynamic model, which the first vehicle needs in order to cover the entire distance predicted within the prediction horizon. The processor unit can be configured for determining an input variable for the electric machine by executing the MPC algorithm as a function of the first term and as a function of the second term such that the cost function is minimized.

The state variables for the "driving efficiency" driving function can therefore be, for example, the vehicle speed or the kinetic energy, the energy remaining in the battery, and the driving time. Energy consumption and driving time can be optimized, for example, on the basis of the uphill grade of the upcoming route and constraints for speed and drive force, and on the basis of the current system state. The driving time, in addition to the overall loss or energy consumption, can also be minimized by the objective function or by the cost function of the "driving efficiency" driving strategy. As a result, depending on the selection of the weighting factors, a low speed cannot always be evaluated as optimal and, thus, the problem no longer exists that the resultant speed is always at the lower edge of the permitted speed. It is made possible that the driver influence is no longer relevant for the energy consumption and the driving time of the first vehicle, because the electric machine can be controlled by the processor unit based on the input variable, which is determined by executing the MPC algorithm. By the input variable, in particular, an optimal prime mover operating point of the electric machine can be set. As a result, a direct regulation of the optimal speed of the first vehicle can be implemented.

The cost function can have, in particular, exclusively linear and quadratic terms. As a result, the overall problem has the form of a quadratic optimization with linear constraints and a convex problem results, which can be solved well and quickly. The objective function or the cost function can be formulated with a weighting (weighting factors), wherein, in particular, an energy efficiency, a driving time, and a ride comfort are calculated and weighted. An energy-optimal speed trajectory for an upcoming horizon can be calculated online on the processor unit, which can form, in particular, an integral part of a central control unit of the first vehicle. By utilizing the MPC method, moreover, the target speed of the first vehicle can be cyclically recalculated based on the current driving mode and the upcoming route information.

Current state variables can be measured and appropriate data can be recorded and supplied to the MPC algorithm. In this way, route data from an electronic map can be updated, in particular cyclically, for a prediction horizon (for example, four hundred meters (400 m)) ahead of the first vehicle. The route data can include, for example, uphill grade information, curve information, and information regarding speed limits. Moreover, a curve curvature can be converted, via a maximum permissible lateral acceleration, into a speed limit for the first vehicle. In addition, a position finding of the first vehicle can be carried out, in particular via a GNSS signal for the precise localization on the electronic map.

The speed data of the second vehicle can include a temporal sequence of actual speeds of the second vehicle determined by the sensor of the first vehicle. An average of the relative or percentage deviation from a speed limit (under consideration of the driving situation) can be calculated via a function. This mean deviation can be applied to an upcoming maximum speed of the second vehicle.

In this way, in one example embodiment, the processor unit can be configured for accessing a first speed limit value, which applies for a first route section on which the second vehicle is traveling, and accessing a second speed limit value, which applies for a second route section on which the second vehicle will travel in the future. The speed limit value, for example, indicated in km/h (kilometer per hour), is a legally permissible or permitted maximum speed for vehicles on a route section. The speed limit value is a mandatory limiting value for the speed of a vehicle, which is not permitted to be exceeded. Colloquially, the term "speed limit" is also common in this context. The speed limit value can be generally established by regulation and indicated by traffic signs and applies for certain vehicles, transport of certain goods, or on certain route sections of roads, rail lines or waterways and, occasionally, also in airspace.

The processor unit can be configured for generating, from the temporal sequence of the actual speed of the second vehicle, a function with respect to time of a relative speed deviation of the actual speed of the second vehicle from the first speed limit value. The "function with respect to time" can be understood as a mathematical function that describes the profile of the relative speed deviation of the actual speed of the second vehicle from the first speed limit value as a function of time.

The processor unit can also be configured for determining a mean relative speed deviation from the function with respect to time of the relative speed deviation, creating the driving behavior profile of the second vehicle based on the mean relative speed deviation, and making a prediction about the future driving behavior of the second vehicle based on the driving behavior profile of the second vehicle, in that a future speed of the second vehicle on the second route section is determined as a function of the mean relative speed deviation and the second speed limit value.

In one simple example, a constant first speed limit of one hundred kilometers per hour (100 km/h) can apply on a first route section, wherein the observed second vehicle moves on the first route section ahead of the first vehicle at eighty kilometers per hour (80 km/h), for example, for a complete observation period, for example, thirty seconds (30 s). In this case, a deviation of negative twenty percent (−20%) from the first speed limit results, also on average. If a new second speed limit (for example, fifty kilometers per hour (50 km/h)) now results on the upcoming travel horizon, the prediction can be made (once the process of speed adaptation has concluded) that a predicted speed of forty kilometers per hour (40 km/h) sets in for the second vehicle (50 km/h*(100%−20%)=40 km/h).

In one further example embodiment, the processor unit is configured for chronologically storing discrete-time relative speed deviations of the actual speed of the second vehicle from the first speed limit value in a data set for an established time period, and, from the discrete-time, chronologically stored relative speed deviations, generating the function with respect to time of the relative speed deviation of the actual speed of the second vehicle from the first speed limit value.

For example, the actual speed $v_{detected}$ of the preceding second vehicle can be determined with reference to available radar information. Thereafter, the relative deviation $\Delta v_{rel}$ of the actual speed $v_{detected}$ of the preceding second vehicle from the first speed limit value $v_{limit1}$ can be determined. The relative speed deviation can be calculated as follows:

$$\Delta V_{rel} = (v_{limit1} - v_{detected})/v_{limit1} \text{ or } \Delta v_{rel} = (v_{detected} - v_{limit1})/v_{limit1}.$$

The computed relative or percentage deviation can be stored in a data set, in particular in a first in, first out (FIFO) vector, wherein the data set can have a preset storage period, for example, thirty seconds (30 s). The data set, in particular the FIFO vector, can be described as a data array, as follows:

$$\vec{\Delta v}_{rel} = [\Delta v_{rel}(t_1); \Delta v_{rel}(t_2); \ldots; \Delta v_{rel}(t_n)]$$

Here, the individual values $\Delta v_{rel}(t_1)$ through $\Delta v_{rel}(t_n)$ represent the calculated percentage deviations at the particular points in time $t_1$ through $t_n$, wherein $t_1$ is the first point in time during a preset storage period (for example, 30 s; "established time period"), and wherein $t_n$ is the last point in time during the preset storage period. The storage in the data set, in particular in the FIFO vector, makes it possible to represent the profile of the percentage deviation of the actual speed of the preceding second vehicle from the first speed limit value. For this purpose, the values $\Delta v_{rel}(t_1)$ through $\Delta v_{rel}(t_n)$ are stored in chronological order within the data set, in particular within the FIFO vector. A function that describes the relative speed difference over time can be generated based on the discrete-time values $\Delta v_{rel}(t_1)$ through $\Delta v_{rel}(t_n)$. The second derivative of this function can be taken, wherein the first derivative describes a temporal sequence of the acceleration of the second vehicle, and wherein the second derivative describes a temporal sequence of the jerk of the second vehicle.

In one further example embodiment, the processor unit is configured for determining a mean acceleration of the second vehicle from the first derivative of the function with respect to time of the speed deviation with respect to time and creating the driving behavior profile of the second vehicle based on the mean acceleration of the second vehicle. For example, vehicles that, on average, have only low accelerations, can be profiled as less aggressive road users.

The information regarding the mean acceleration can be applied to acceleration and braking maneuvers of the second vehicle. Acceleration and braking maneuvers result, in particular, during surges of the permitted maximum speed, ahead of traffic lights or intersections. Similarly to the above-described prediction of the speed of the second vehicle, a mean (=characteristic) value for the acceleration is also calculated here, for example, at speed limit value transitions. The processor unit can be configured, in this sense, for making a prediction about the future driving behavior of the second vehicle based on the driving behavior profile of the second vehicle, in that a future acceleration of the second vehicle, in particular on the first route section, is determined as a function of the mean acceleration, the mean relative speed deviation, and the second speed limit value.

For example, the value negative one meters per second-squared (−1 m/s²) can be calculated for the mean acceleration, i.e., the second vehicle brakes, on average, with this negative acceleration value (braking maneuver). If a change of the speed limit value now results on the horizon (for example, from one hundred kilometers per hour (100 km/h) as the first speed limit value to fifty kilometers per hour (50 km/h) as the second speed limit value), the mean or characteristic acceleration can be used for the prediction. Here, it can be assumed, in particular, that at the beginning of the new second speed limit value, the second vehicle will have reached the target speed of the second vehicle, which can be determined as described above as a function of the mean relative speed deviation and the second speed limit value. Starting from this waypoint (the transition between the first route section, for which the first speed limit value applies, and the second route section, for which the second speed limit value applies), it can then be determined via back-calculation when and where the braking maneuver begins.

A characteristic jerk of the second vehicle can be used, in a similar way, to predict an acceleration transition of the second vehicle. In this sense, the processor unit can be configured for determining a mean jerk of the second vehicle from the second derivative of the function with respect to time of the speed deviation with respect to time and creating the driving behavior profile of the second vehicle based on the mean jerk of the second vehicle. For example, vehicles that, on average, have only a low jerk, can be profiled as less aggressive road users. The processor unit can also be configured for making a prediction about the future driving behavior of the second vehicle based on the driving behavior profile of the second vehicle, in that a future jerk of the second vehicle, in particular on the first route section, is determined as a function of the mean jerk, the mean acceleration, the mean relative speed deviation, and the second speed limit value. For example, a value of negative one meters per second-cubed (−1 m/s³) can be determined for the mean jerk. In this case, in the above-described braking maneuver, for example, a transition of the acceleration from zero meters per second-squared (0 m/s²) to negative one meters per second-squared (−1 m/s²) would last for one second (1 s). As a result, the duration of the transition between no brake pedal position and the characteristic brake pedal position can be predicted. The jerk is constant for the duration of this transition.

The maximum values for jerk and acceleration can also be used to detect the possibility of an emergency brake application. In this sense, the processor unit can be configured for determining a maximum acceleration of the second vehicle from the first derivative of the function with respect to time of the speed deviation with respect to time and determining a maximum jerk of the second vehicle from the second derivative of the function with respect to time of the speed deviation with respect to time and creating the driving behavior profile of the second vehicle based on the maximum acceleration and based on the maximum jerk of the second vehicle. In addition, the processor unit can be configured for making a prediction about the future driving behavior of the second vehicle based on the driving behavior profile of the second vehicle, in that an emergency brake application of the second vehicle is detected as a function of the maximum acceleration and the maximum jerk.

The above-described functionalities or steps can be carried out in each computation step (usually once every ten milliseconds (10 ms)) within the scope of an MPC approach. In this sense, the processor unit can be configured for making a prediction about the future driving behavior of the second vehicle for each execution of the MPC algorithm to determine the trajectory for the first vehicle.

According to a second example aspect of the invention, a driver assistance system is provided for carrying out a driver assistance function of a first vehicle under consideration of the driving behavior of a second vehicle, wherein the second vehicle is traveling ahead of the first vehicle. The driver assistance system is configured for accessing, in particular by a communication interface, a trajectory for the first vehicle determined by a processor unit according to the first example aspect of the invention and, in particular by a processor unit, carrying out a driver assistance function of the first vehicle by utilizing the trajectory for the first vehicle.

The driver assistance function includes an autonomous driving function or a semi-autonomous driving function. The autonomous driving function enables the vehicle to travel autonomously, i.e., without a vehicle occupant controlling the vehicle. The driver has handed over the control of the vehicle to the driver assistance system. Thus, the autonomous driving function includes the vehicle being configured—in particular by the processor unit for determining the trajectory of the vehicle or the processor unit of the driver assistance system—for carrying out, for example, steering, turn-signaling, acceleration and braking maneuvers without human intervention and controlling, by an open-loop system, in particular, external lighting and signaling, such as turn-signal lights of the vehicle. The semi-autonomous driving function can be understood as a driving function that assists a driver of the vehicle in the control of the vehicle, in particular during steering, turn-signaling, acceleration and braking maneuvers, wherein the driver still has the control of the vehicle.

According to a third example aspect of the invention, a first vehicle is provided. The first vehicle includes a sensor, in particular a radar sensor. The sensor is configured for generating speed data of a second vehicle, which is traveling ahead of the first vehicle. In addition, the first vehicle includes a processor unit according to the first example aspect of the invention and a driver assistance system according to the second example aspect of the invention.

The first vehicle is, in particular, a motor vehicle, for example, an automobile (for example, a passenger car having a weight of less than three and a half (3.5 t)), a motorcycle, a motor scooter, a moped, a bicycle, an e-bike, a bus, or a truck (for example, having a weight of more than three and a half tons (3.5 t)), or also a rail vehicle, a ship, or an aircraft, such as a helicopter or an airplane. The invention can also be utilized in small, lightweight electric motor vehicles for micromobility, wherein these motor vehicles are utilized, in particular, in city traffic and for the first mile and the last mile in rural areas. The first mile and the last mile can be understood as all routes and paths that are located in the first and last links of a mobility chain. This is, for example, the path from home to the train station or the route from the train station to the workplace. In other words, the invention is usable in all areas of transportation, such as automotive, aviation, nautical science, astronautics, etc.

According to a fourth example aspect of the invention, a method is provided for determining a trajectory for a first vehicle under consideration of the driving behavior of a second vehicle, wherein the second vehicle is traveling ahead of the first vehicle. The method includes the following:

generating speed data of the second vehicle;

creating a driving behavior profile of the second vehicle based on the speed data;

making a prediction about the future driving behavior of the second vehicle based on the driving behavior profile of the second vehicle; and determining a trajectory for the first vehicle by executing an MPC algorithm, which includes a longitudinal dynamic model of the first vehicle and a cost function to be minimized, such that the cost function is minimized, wherein the prediction about the future driving behavior of the second vehicle is taken into account as a constraint in the determination of the trajectory.

According to a fifth example aspect of the invention, a computer program product is provided for determining a trajectory for a first vehicle under consideration of the driving behavior of a second vehicle, wherein the second vehicle is traveling ahead of the first vehicle. The computer program product, when run on a processor unit, instructs the processor unit to:

access speed data of the second vehicle, wherein the speed data have been generated by a sensor of the first vehicle;

create a driving behavior profile of the second vehicle based on the speed data;

make a prediction about the future driving behavior of the second vehicle based on the driving behavior profile of the second vehicle; and determine a trajectory for the first vehicle by executing an MPC algorithm, which includes a longitudinal dynamic model of the first vehicle and a cost function to be minimized, such that the cost function is minimized, wherein the prediction about the future driving behavior of the second vehicle is taken into account as a constraint in the determination of the trajectory. The MPC algorithm, as software code, can form an integral part of the computer program product.

The comments made in conjunction with the processor unit according to the first aspect of the invention also apply similarly for the driver assistance system according to the second aspect of the invention, for the first vehicle according to the third aspect of the invention, for the method according to the fourth aspect of the invention, and for the computer program product according to the fifth aspect of the invention.

BRIEF DESCRIPTION OF THE DRAWINGS

Exemplary embodiments of the invention are explained in greater detail in the following with reference to the diagrammatic drawings, wherein identical or similar elements are labeled with the same reference characters, wherein.

DETAILED DESCRIPTION

Figure 1:
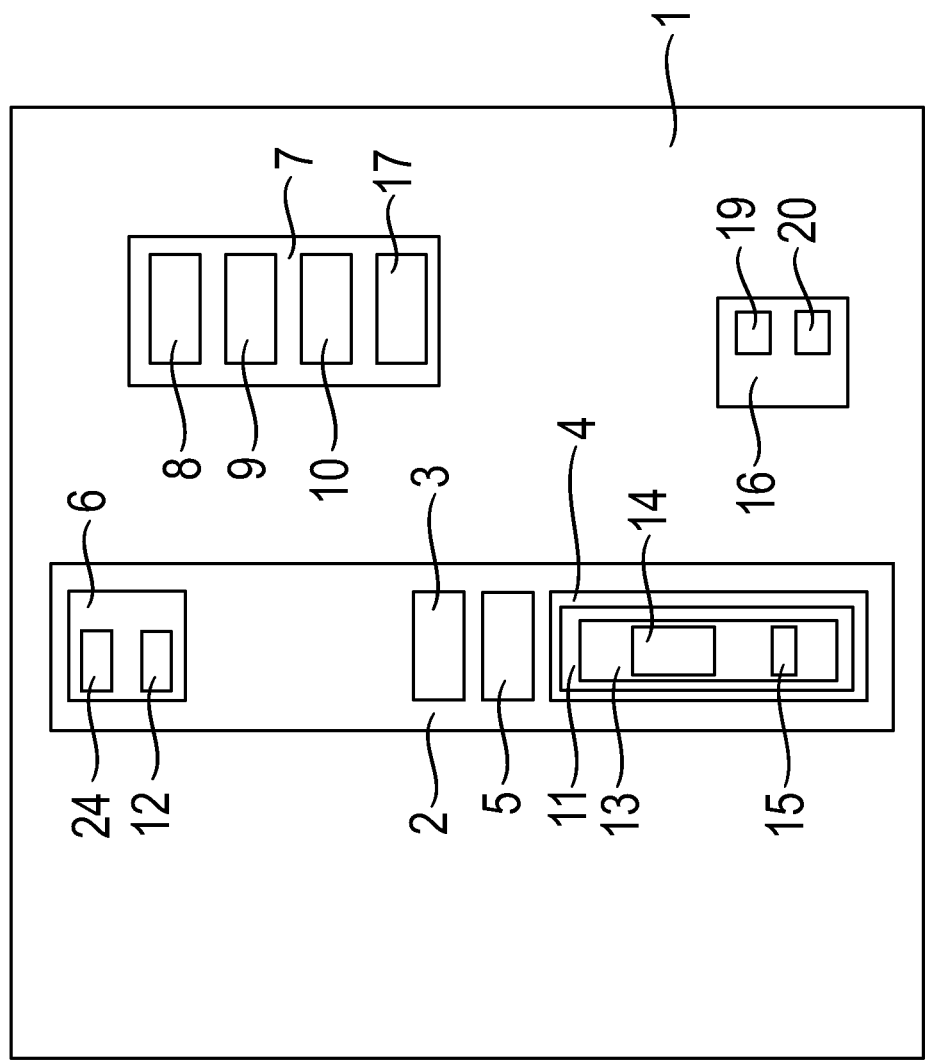
FIG. 1 shows a schematic of a first vehicle.

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

FIG. 1 shows a first vehicle 1. In the exemplary embodiment shown, the first vehicle is a motor vehicle, for example, a passenger car. The motor vehicle 1 includes an MPC system 2 for determining a trajectory for the first motor vehicle 1 under consideration of the driving behavior of a second vehicle 18 shown in FIG. 2, wherein the second vehicle 18 is traveling ahead of the first motor vehicle 1. In the exemplary embodiment shown, the second vehicle 18 is also a motor vehicle, for example, also a passenger car. The first motor vehicle 1 also includes a driver assistance system 16 including a processor unit 19 and including a communication interface 20.

The MPC system 2 in the exemplary embodiment shown includes a processor unit 3, a memory unit 4, a communication interface 5, and a detection unit 6, in particular for determining the speed of a preceding vehicle (in the example of the second motor vehicle 18 shown in FIG. 2) and for gathering further surroundings data and state data related to the motor vehicle 1. The motor vehicle 1 also includes a drive train 7, which can include, for example, an electric machine 8, which can be operated as a motor and as a generator, a battery 9, and a transmission 10. The electric machine 8, in the motor mode, can drive wheels of the motor vehicle 1 via the transmission 10, which can have, for example, a constant ratio. The battery 9 can provide the electrical energy necessary therefor. The battery 9 can be charged by the electric machine 8 when the electric machine 8 is operated in the generator mode (recuperation). Optionally, the battery 9 can also be charged at an external charging station. Likewise, the drive train of the motor vehicle 1 can optionally include an internal combustion engine 17, which, alternatively or in addition to the electric machine 8, can drive the motor vehicle 1. The internal combustion engine 17 can also drive the electric machine 8 in order to charge the battery 9.

A computer program product 11 can be stored on the memory unit 4. The computer program product 11 can be run on the processor unit 3, for the purpose of which the processor unit 3 and the memory unit 4 are connected to each other by the communication interface 5. When the computer program product 11 is run on the processor unit 3, the computer program product 11 instructs the processor unit 3 to perform the functions described in conjunction with the drawing and/or to carry out method steps.

The computer program product 11 includes an MPC algorithm 13. The MPC algorithm 13 includes a longitudinal dynamic model 14 of the drive train 7 of the motor vehicle 1. In addition, the MPC algorithm 13 includes a cost function 15 to be minimized. The processor unit 3 executes the MPC algorithm 13 and determines an optimal speed trajectory of the first motor vehicle 1 based on the longitudinal dynamic model 14 such that the cost function 15 is minimized.

In addition, an optimal rotational speed and an optimal torque of the electric machine 8 for calculated points in the prediction horizon can result as the output of the optimization by the MPC algorithm 13. For this purpose, the processor unit 3 can determine an input variable for the electric machine 8, enabling the optimal rotational speed and the optimal torque to set in. The processor unit 3 can control, by way of an open-loop system, the electric machine 8 based on the determined input variable. In addition, this can also be carried out by the driver assistance system 16, however.

Figure 2:
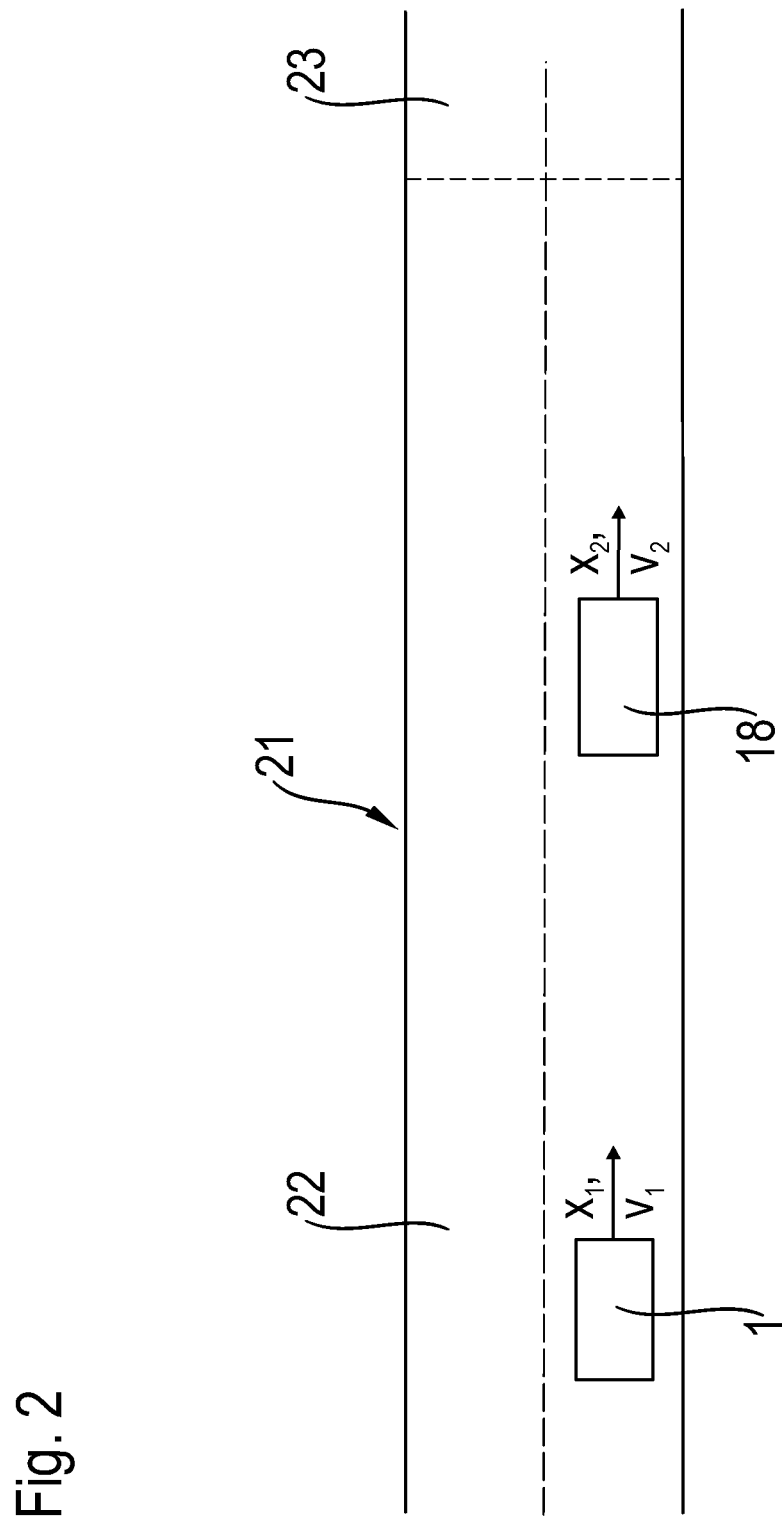
FIG. 2 shows a second vehicle, which is traveling on a first route section of a road ahead of the first vehicle according to FIG. 1.

The detection unit 6 can measure current state variables of the first motor vehicle 1, record appropriate data, and supply these to the MPC algorithm 13. In addition, route data from an electronic map can be updated, in particular cyclically, for a prediction horizon (for example, four hundred meters (400 m)) ahead of the motor vehicle 1. The route data can include, for example, uphill grade information, curve information, and information regarding speed limits. Moreover, a curve curvature can be converted, via a maximum permissible lateral acceleration, into a speed limit for the motor vehicle 1. In addition, a position finding of the first motor vehicle 1 can be carried out by the detection unit 6, in particular via a signal generated by a GNSS sensor 12 for the precise localization on the electronic map. Moreover, the detection unit 6 includes a radar sensor 24, in particular for determining the speed of preceding vehicles 18 (FIG. 2). The processor unit 3 can access information of the aforementioned elements, for example, via the communication interface 5. This information can be incorporated into the longitudinal dynamic model 14 of the motor vehicle 1, in particular as restrictions or constraints.

The highly simplified example according to FIG. 2 shows the first motor vehicle 1 on a first route section 22 of a road 21. The first motor vehicle 1 is traveling autonomously, assisted by the above-described driver assistance function, at a first speed $v_1$ in a first direction of travel $x_1$. The second motor vehicle 18 is located ahead of the first motor vehicle 1 also on the first route section 22 of the road 21. The second motor vehicle 18 is traveling ahead of the first motor vehicle 1 at a second speed $v_2$ in a second direction of travel $x_2$. In the exemplary embodiment shown, the first route section 22 extends straight and the first direction of travel $x_1$ of the first motor vehicle 1 corresponds to the second direction of travel $x_2$ of the second motor vehicle 18. This is purely by way of example and not mandatory, however. The first speed $v_1$ of the first motor vehicle 1 can correspond to the second speed $v_2$ of the second motor vehicle 18 ($v_1=v_2$), which is also purely by way of example and not mandatory, however. The first speed $v_1$ of the first motor vehicle 1 can also deviate from the second speed $v_2$ of the second motor vehicle 18 ($v_1 \neq v_2$).

A first statutory speed limit, which can be set, for example, at a first speed limit value of $v_{limit1}=100$ km/h, applies on the first route section 22. The second motor vehicle 18 is traveling ahead of the first motor vehicle in the direction of a second route section 23 on which the second motor vehicle 2 is likely to travel in the future. The first motor vehicle 1 follows the second motor vehicle 18 in the direction of the second route section 23. A second statutory speed limit, which can be set, for example, at a second speed limit value of $v_{limit2}=50$ km/h, applies on the second route section 23.

The first speed limit value $v_{limit1}$ and the second speed limit value $v_{limit2}$ can be stored, for example, in a map of a navigation system of the first motor vehicle 1. The processor unit 3 of the MPC system 2 can access—by the communication interface 5—the first speed limit value $v_{limit1}$ and the second speed limit value $v_{limit2}$.

The radar sensor 24 generates speed data of the second motor vehicle 18. The processor unit 3 of the MPC system 2 can access the speed data by the communication interface 5. In the exemplary embodiment shown, the radar sensor 24 determines an actual speed $v_{detected}(t_1)$ through $v_{detected}(t_n)$ of the second motor vehicle 18 at discrete points in time $t_1$ through $t_n$, respectively, as the result of which the temporal sequence of the speed $v_1$ of the second motor vehicle 18 can be described.

Based on the determined actual speeds $v_{detected}(t_1)$ through $v_{detected}(t_n)$ of the second motor vehicle 18 and the first speed limit value $v_{limit1}$, the processor unit 3 determines discrete-time relative speed deviations $\Delta v_{rel}(t_1)$ through $\Delta v_{rel}(t_n)$ of the actual speeds $v_{detected}(t_1)$ through $v_{detected}(t_n)$ of the second vehicle 18 from the first speed limit value $v_{limit1}$. The relative speed deviations $\Delta v_{rel}(t_1)$ through $\Delta v_{rel}(t_n)$ can be calculated, for example, as follows:

$$\Delta v_{rel}(t_i) = \frac{v_{detected}(t_i) - v_{limit1}}{v_{limit1}};$$

for all i from 1 to n.

The relative speed deviations $\Delta v_{rel}(t_1)$ through $\Delta v_{rel}(t_n)$ can be stored in a data set, in a first in, first out (FIFO) vector in the example shown, wherein the FIFO vector can have a preset storage period, for example, thirty seconds (30 s). The FIFO vector can be described as a data array, as follows:

$$\overrightarrow{\Delta v_{rel}} = [\Delta v_{rel}(t_1); \Delta v_{rel}(t_2); \ldots ; \Delta v_{rel}(t_n)]$$

Here, the individual values $\Delta v_{rel}(t_1)$ through $\Delta v_{rel}(t_n)$ represent the calculated percentage deviations at the particular points in time $t_1$ through $t_n$, wherein $t_1$ is the first point in time during the preset storage period (for example, 30 s), and wherein $t_n$ is the last point in time during the preset storage period. The storage in the FIFO vector makes it possible to represent the profile of the percentage deviation of the actual speed of the preceding second vehicle 18 from the first speed limit value $v_{limit1}$. For this purpose, the values $\Delta v_{rel}(t_1)$ through $\Delta v_{rel}(t_n)$ are stored in chronological order within the FIFO vector. Based on the discrete-time values $\Delta v_{rel}(t_1)$ through $\Delta v_{rel}(t_n)$, the processor unit 3 can generate a function $\Delta V_{rel}(t)$, which describes the relative speed difference $\Delta v_{rel}$ over time t. The processor unit 3 can take the second derivative of this function, wherein the first derivative $\Delta v'_{rel}(t)$ describes a temporal sequence of the acceleration a of the second vehicle 18, and wherein the second derivative $\Delta v\Delta_{rel}(t)$ describes a temporal sequence of the jerk j of the second vehicle 18.

The processor unit 3 determines the following values:

a mean relative speed deviation $\Delta v_{rel\ average}$ of the second vehicle 18 from the function $\Delta v_{rel}(t)$, which describes the relative speed difference $\Delta v_{rel}$ over time t;

a mean acceleration $a_{average}$ of the second vehicle 18 from the first derivative with respect to time $\Delta v'_{rel}(t)$ of the function $\Delta v_{rel}(t)$, which describes the relative speed difference $\Delta v_{rel}$ over time t;

a maximum acceleration $a_{max}$ of the second vehicle 18 from the first derivative with respect to time $\Delta v'_{rel}(t)$ of the function $\Delta v_{rel}(t)$, which describes the relative speed difference $\Delta v_{rel}$ over time t;

a mean jerk $j_{average}$ of the second vehicle 18 from the second derivative with respect to time $\Delta v''_{rel}(t)$ of the function $\Delta v_{rel}(t)$, which describes the relative speed difference $\Delta v_{rel}$ over time t; and a maximum jerk $j_{max}$ of the second vehicle 18 from the second derivative with respect to time $\Delta v''_{rel}(t)$ of the function $\Delta v_{rel}(t)$, which describes the relative speed difference $\Delta v_{rel}$ over time t.

Based on at least one of these values $\Delta v_{rel\ average}$, $a_{average}$, $a_{max}$, $j_{average}$ and $j_{max}$, the processor unit 3 creates a profile, which describes the driving behavior of the second motor vehicle 18 ("driving behavior profile"). If the second motor vehicle 18 remains, for example, on average, considerably below the maximum speed $v_{limit1}$ and, on average, has only low accelerations a and jerks j, the second motor vehicle 18 can be profiled, for example, as a less aggressive road user. Based on the driving behavior profile of the second vehicle 18, the processor unit 3 makes a prediction about the future driving behavior of the second vehicle 18.

As mentioned above, a speed limit value $v_{limit1}=100$ km/h applies on the first route section 22. The second vehicle 18 can move on the first route section 22 ahead of the first vehicle 1 at an actual speed $v_{detected}$ of 80 km/h, for example, for a complete observation period, for example, 30 s. This yields a mean relative speed deviation $\Delta v_{rel\ average}$ of $-20\%$ from the first speed limit value $v_{limit1}$. On the upcoming travel horizon, the second speed limit value of 50 km/h results for the second route section 23. The processor unit 3 makes the prediction in this case (after the process of speed adaptation has concluded) that the second motor vehicle 18 will move on the second route section 23 at a speed of 40 km/h (50 km/h*(100%−20%)=40 km/h).

For example, the value $-1$ m/s$^2$ can be calculated for the mean acceleration, i.e., the second vehicle 18 brakes, on average, with this negative acceleration value (braking maneuver). If the change of the speed limit value from 100 km/h to 50 km/h now results on the horizon, the mean acceleration $a_{average}$ can be used to predict the driving behavior of the second motor vehicle 18. Here, it can be assumed, in particular, that, at the beginning of the second speed limit value $v_{limit2}$, the second vehicle 18 will have reached the target speed (40 km/h) of the second vehicle, which can be determined as described above as a function of the mean relative speed deviation $\Delta v_{rel\ average}$ and the second speed limit value $v_{limit2}$. Starting from this waypoint (the transition between the first route section 22 and the second route section 23), it can then be determined via back-calculation when and where the braking maneuver of the second motor vehicle 18 begins.

The mean jerk $j_{average}$ of the second vehicle 18 can be used, in a similar way, to predict an acceleration transition of the second vehicle 18. For example, a value of $-1$ m/s$^3$ can be determined for the mean jerk $j_{average}$. In this case, in the above-described braking maneuver, for example, a transition of the acceleration from 0 m/s$^2$ to $-1$ m/s$^2$ would last for one second. As a result, the duration of the transition between no brake pedal position and the characteristic brake pedal position can be predicted. The jerk j is constant for the duration of this transition. The maximum values $a_{max}$ and $j_{max}$ for acceleration and jerk can also be used to detect the possibility of an emergency brake application.

The processor unit 3 determines a trajectory for the first motor vehicle 1 by executing the MPC algorithm 13, such that the cost function 15 is minimized, wherein the prediction about the future driving behavior of the second vehicle 18 is taken into account as a constraint in the determination of the trajectory. In addition, in particular, a route topology, the traffic, and further surroundings information are also taken into account in order to determine the optimal speed trajectory for the first vehicle 1 for the upcoming route section.

The processor unit 19 of the driver assistance system 16 accesses—by the communication interface 20—the trajectory for the first motor vehicle 1 determined by a processor unit 3 of the MPC system 2 and carries out the autonomous driving function of the first motor vehicle 1 by utilizing the trajectory for the first motor vehicle 1. Alternatively, the processor unit 3 of the MPC system 2 can also carry out the autonomous driving function of the first motor vehicle 1 by utilizing the trajectory for the first motor vehicle 1. In this case, the driver assistance system 16 is integrated into the MPC system 2, and the MPC system 2 forms the driver assistance system 16.

Possible example embodiments of the longitudinal dynamic model 14 and of the cost function 15, which are integral parts of the MPC algorithm 13 for determining the trajectory for the first motor vehicle 1, are described in greater detail in the following.

The longitudinal dynamic model 14 of the motor vehicle 1 can be expressed mathematically as follows:

$$\frac{dv(t)}{dt} = (F_{trac}(t) - F_r(\alpha(t)) - F_{gr}(\alpha(t)) - F_d(v(t)))/m_{eq}$$

Wherein:
v is the speed of the motor vehicle;
$F_{trac}$ is the tractive force that is exerted by the prime mover or the brakes upon the wheels of the motor vehicle,
$F_r$ is the rolling resistance, which is an effect of the deformation of the tires during rolling and depends on the load of the wheels (on the normal force between the wheel and the road) and, thus, on the inclination angle of the road;
$F_{gr}$ is the gradient resistance, which describes the longitudinal component of gravity, which acts upon the vehicle during operation uphill or downhill, depending on the inclination of the roadway;
$F_d$ is the drag force of the motor vehicle; and
$m_{eq}$ is the equivalent mass of the motor vehicle; the equivalent mass includes, in particular, the inertia of the turned parts of the drive train, which are subjected to the acceleration of the motor vehicle (prime mover, transmission input shafts, wheels).

By converting time dependence into distance dependence $$\frac{d}{ds} = \frac{d}{dt} * \frac{dt}{ds} = \frac{d}{dt} * \frac{1}{v}$$

and coordinate transformation in order to eliminate the quadratic speed term in the aerodynamic drag with $$e_{kin} = \frac{1}{2} * m_{eq} * v(t)^2,$$

the result is $$\frac{de_{kin}}{ds} = F_{trac}(s) - F_r(\alpha(s)) - F_{gr}(\alpha(s)) - F_d(e_{kin}(s)).$$

In order to ensure that the problem is quickly and easily solvable by the MPC algorithm 13, the dynamic equation of the longitudinal dynamic model 14 can be linearized, in that the speed is expressed, via coordinate transformation, by kinetic energy $de_{kin}$. As a result, the quadratic term for calculating the aerodynamic drag $F_d$ is replaced by a linear term and, simultaneously, the longitudinal dynamic model 14 of the motor vehicle 1 is no longer described as a function of time, as usual, but rather as a function of distance. This fits well with the optimization problem, since the predictive information of the electrical horizon is present in a distance-based manner.

In addition to the kinetic energy, there are two further state variables, which, within the scope of a simple optimization problem, can also be described in a linear and distance-dependent manner. On the one hand, the electrical energy consumption of the drive train 7 is usually described in the form of a characteristic map as a function of torque and prime mover speed. In the exemplary embodiment shown, the motor vehicle 1 has a fixed ratio between the electric machine 8 and the road on which the motor vehicle 1 moves. As a result, the rotational speed of the electric machine 8 can be directly converted into a speed of the motor vehicle 1 or even into a kinetic energy of the motor vehicle 1. In addition, the electrical power of the electric machine 8 can be converted into energy consumption per meter via division by the appropriate speed. In order to be able to utilize a corresponding characteristic map for the optimization, it is linearly approximated: $\text{Energy}_{perMeter} \geq a_i * e_{kin} + b_i * F_{trac}$ for all i.

The cost function 15 to be minimized can be expressed mathematically, for example, as follows:

$$\min \left( \begin{array}{c} w_{Bat} \cdot E_{Bat}(s_E) + w_{Time} \cdot T(s_E) + w_{Tem} \cdot \sum_{s=1}^{s_E-1} \left( \frac{F_A(s) - F_A(s-1)}{\Delta s} \right)^2 + \\ w_{TemStart} \cdot (F_A(s_1) - F_A(s_0))^2 + \sum_{s=1}^{s_E-1} w_{Slack} \cdot \text{Var}_{slack} \end{array} \right)$$

Wherein:
$w_{Bat}$ is the weighting factor for the energy consumption of the battery
$E_{Bat}$ is the energy consumption of the battery
S is the distance
$S_{E-1}$ is the distance one time step before the end of the prediction horizon
$F_A$ is a drive force that is provided by the electric machine, transmitted by a transmission at a constant ratio, and applied at a wheel of the motor vehicle
$W_{Tem}$ is the weighting factor for torque gradients
$W_{TemStart}$ is the weighting factor for torque surges
T is the time that the vehicle needs in order to cover the entire distance predicted within the prediction horizon
$W_{Time}$ is the weighting factor for the time T
$S_E$ is the distance to the end of the horizon
$W_{Slack}$ is the weighting factor for the slack variable
$\text{Var}_{Slack}$ is the slack variable The cost function 15 has exclusively linear and quadratic terms in the exemplary embodiment shown. As a result, the overall problem has the form of a quadratic optimization with linear constraints and a convex problem results, which can be solved well and quickly.

The cost function 15 includes, as a first term, an electrical energy $E_{Bat}$ weighted with a first weighting factor $w_{Bat}$ and predicted according to the longitudinal dynamic model, which is provided within a prediction horizon by the battery 9 of the drive train 7 for driving the electric machine 8.

The cost function 15 includes, as one further term, a driving time T weighted with a second weighting factor $W_{Time}$ and predicted according to the longitudinal dynamic model 14, which the motor vehicle 1 needs in order to cover the predicted distance. As a result, depending on the selection of the weighting factors, a low speed cannot always be evaluated as optimal and, thus, the problem no longer exists that the resultant speed is always at the lower edge of the permitted speed.

The energy consumption and the driving time can both be evaluated and weighted at the end of the horizon. These terms are therefore active only for the last point of the horizon.

Excessively high torque gradients within the horizon are disadvantageous. Therefore, torque gradients are already penalized in the cost function 15, namely by the term $$w_{Tem} \cdot \sum_{s=1}^{s_E-1} \left( \frac{F_A(s) - F_A(s-1)}{\Delta s} \right)^2.$$

The quadratic deviation of the drive force per meter is weighted with a weighting factor $W_{Tem}$ and minimized in the cost function. Alternatively to the drive force $F_A$ per meter, the torque $M_{EM}$ provided by the electric machine 8 can also be utilized and weighted with the weighting factor $W_{Tem}$, and so the alternative term $$w_{Tem} \cdot \sum_{s=1}^{s_E-1} \left( \frac{M_{EM}(s) - M_{EM}(s-1)}{\Delta s} \right)^2$$

results. Due to the constant ratio of the transmission 10, the drive force and the torque are directly proportional to one another.

In order to ensure comfortable driving, one further term is introduced in the cost function 15 for penalizing torque surges, namely $w_{TemStart} \cdot (F_A(s_1) - F_A(s_0))^2$. Alternatively to the drive force $F_A$, the torque $M_{EM}$ provided by the electric machine 8 can also be utilized here, and so the alternative term $w_{TemStart} \cdot (M_{EM}(s_1) - M_{EM}(s_0))^2$ results. For the first point in the horizon, the deviation from the most recently set torque can be evaluated as negative and weighted with a weighting factor $w_{TemStart}$ in order to ensure that there is a seamless and smooth transition during the change-over between an old trajectory and a new trajectory.

Speed limits are hard limits for the optimization that are not permitted to be exceeded. A slight exceedance of the speed limits is always permissible in reality and tends to be the normal case primarily during transitions from one speed zone into a second zone. In dynamic surroundings, where speed limits shift from one computing cycle to the next computing cycle, it can happen, in the case of very hard limits, that a valid solution for a speed profile can no longer be found. In order to increase the stability of the computational algorithm, a soft constraint is introduced into the cost function 15. A slack variable $Var_{Slack}$ weighted with a weighting factor $W_{Slack}$ becomes active in a predefined narrow range before the hard speed limit is reached. Solutions that are situated very close to this speed limit are evaluated as poorer, i.e., solutions, the speed trajectory of which maintains a certain distance to the hard limit.

Modifications and variations can be made to the embodiments illustrated or described herein without departing from the scope and spirit of the invention as set forth in the appended claims. In the claims, reference characters corresponding to elements recited in the detailed description and the drawings may be recited. Such reference characters are enclosed within parentheses and are provided as an aid for reference to example embodiments described in the detailed description and the drawings. Such reference characters are provided for convenience only and have no effect on the scope of the claims. In particular, such reference characters are not intended to limit the claims to the particular example embodiments described in the detailed description and the drawings.

REFERENCE CHARACTERS $v_1$ speed of the first motor vehicle
$x_1$ direction of travel of the first motor vehicle
$v_2$ speed of the second motor vehicle
$x_2$ direction of travel of the second motor vehicle
1 first motor vehicle
2 MPC system
3 processor unit
4 memory unit
5 communication interface
6 detection unit
7 drive train
8 electric machine
9 battery
10 transmission
11 computer program product
12 GNSS sensor
13 MPC algorithm
14 longitudinal dynamic model
15 cost function
16 driver assistance system
17 internal combustion engine
18 second motor vehicle
19 processor unit of the driver assistance system
20 communication interface of the driver assistance system
21 road
22 first route section
23 second route section
24 radar sensor

The invention claimed is:

1. A processor unit (3) for determining a trajectory for a first vehicle (1) under consideration of driving behavior of a second vehicle (18), wherein the second vehicle (18) is traveling ahead of the first vehicle (1), the processor unit (3) configured for:
accessing speed data of the second vehicle (18), the speed data generated by a sensor (24) of the first vehicle (1) the speed data including a temporal progression of actual speeds of the second vehicle (18) determined by the sensor (24) of the first vehicle (1);
accessing a first speed limit value that applies for a first route section (22) on which the second vehicle (18) is traveling;
accessing a second speed limit value that applies for a second route section (23) on which the second vehicle (18) will travel in the future;
generating, from the temporal sequence of the actual speed of the second vehicle (18), a function with respect to time of a relative speed deviation of the actual speed of the second vehicle (18) from the first speed limit value;
determining a mean relative speed deviation from the function with respect to time of the relative speed deviation;
creating a driving behavior profile of the second vehicle (18) based on the speed data and the mean relative speed deviation;
making a prediction about future driving behavior of the second vehicle (18) based on the driving behavior profile of the second vehicle (18) in that a future speed of the second vehicle (18) on the second route section (23) is determined as a function of the mean relative speed deviation and the second speed limit value; and
determining a trajectory for the first vehicle (1) by executing an MPC algorithm (13), which includes a longitudinal dynamic model (14) of the first vehicle (1) and a cost function (15), such that the cost function (15) is minimized, wherein the prediction about the future driving behavior of the second vehicle (18) is taken into account as a constraint in the determination of the trajectory.

2. The processor unit (3) of claim 1, wherein the processor unit (3) is configured for:
chronologically storing discrete-time relative speed deviations of the actual speed of the second vehicle (18) from the first speed limit value in a data set for an established time period; and
from the chronologically stored, discrete-time relative speed deviations, generating the function with respect to time of the relative speed deviation of the actual speed of the second vehicle (18) from the first speed limit value.

3. The processor unit (3) of claim 1, wherein the processor unit (3) is configured for:
determining a mean acceleration of the second vehicle (18) from the first derivative of the function with respect to time of the speed deviation with respect to time;
creating the driving behavior profile of the second vehicle (18) based on the mean acceleration of the second vehicle (18); and
making the prediction about the future driving behavior of the second vehicle (18) based on the driving behavior profile of the second vehicle (18) in that a future acceleration of the second vehicle (18) on the first route section (22) is determined as a function of the mean acceleration, the mean relative speed deviation, and the second speed limit value.

4. The processor unit (3) of claim 3, wherein the processor unit (3) is configured for:
determining a mean jerk of the second vehicle (18) from the second derivative of the function with respect to time of the speed deviation with respect to time;
creating the driving behavior profile of the second vehicle (18) based on the mean jerk of the second vehicle (18); and
making the prediction about the future driving behavior of the second vehicle (18) based on the driving behavior profile of the second vehicle (18), in that a future jerk of the second vehicle (18) on the first route section (22) is determined as a function of the mean jerk, the mean acceleration, the mean relative speed deviation, and the second speed limit value.

5. The processor unit (3) of claim 3, wherein the processor unit (3) is configured for
determining a maximum acceleration of the second vehicle (18) from the first derivative of the function with respect to time of the speed deviation with respect to time;
determining a maximum jerk of the second vehicle (18) from the second derivative of the function with respect to time of the speed deviation with respect to time;
creating the driving behavior profile of the second vehicle (18) based on the maximum acceleration and based on the maximum jerk of the second vehicle (18); and
making the prediction about the future driving behavior of the second vehicle (18) based on the driving behavior profile of the second vehicle (18) in that an emergency brake application of the second vehicle (18) is detected as a function of the maximum acceleration and the maximum jerk.

6. The processor unit (3) of claim 1, wherein the processor unit (3) is configured for making a prediction about the future driving behavior of the second vehicle (18) for each execution of the MPC algorithm (13) to determine the trajectory for the first vehicle (1).

7. A driver assistance system (16) for carrying out a driver assistance function of a first vehicle (1) under consideration of driving behavior of a second vehicle (18) traveling ahead of the first vehicle (1), the driver assistance system (16) configured for:
accessing a trajectory for the first vehicle (1) determined by the processor unit (3) of claim 1; and
carrying out a driver assistance function of the first vehicle (1) by utilizing the trajectory for the first vehicle (1).

8. A first vehicle (1), comprising:
a sensor (24) configured for generating speed data of a second vehicle (18) traveling ahead of the first vehicle (1);
the processor unit (3) of claim 1; and
a driver assistance system (16) for carrying out a driver assistance function of the first vehicle (1) under consideration of driving behavior of the second vehicle (18) traveling ahead of the first vehicle (1), the driver assistance system (16) configured for accessing a trajectory for the first vehicle (1) determined by the processor unit (3) and for carrying out a driver assistance function of the first vehicle (1) by utilizing the trajectory for the first vehicle (1).

9. A method for determining a trajectory for a first vehicle (1) under consideration of the driving behavior of a second vehicle (18) traveling ahead of the first vehicle (1), the method comprising:
generating speed data of the second vehicle (18), the speed data comprising a temporal sequence of actual speeds of the second vehicle (18) determined by the sensor (24) of the first vehicle (1);
accessing a first speed limit value that applies for a first route section (22) on which the second vehicle (18) is traveling;
accessing a second speed limit value that applies for a second route section (23) on which the second vehicle (18) will travel in the future;
generating a function with respect to time of a relative speed deviation of the actual speed of the second vehicle (18) from the first speed limit value from the temporal sequence of the actual speed of the second vehicle (18);
determining a mean relative speed deviation from the function with respect to time of the relative speed deviation;
creating a driving behavior profile of the second vehicle (18) based on the speed data and the mean relative speed deviation;
making a prediction about the future driving behavior of the second vehicle (18) based on the driving behavior profile of the second vehicle (18) in that a future speed of the second vehicle (18) on the second route section (23) is determined as a function of the mean relative speed deviation and the second speed limit value; and
determining a trajectory for the first vehicle (1) by executing an MPC algorithm (13), which includes a longitudinal dynamic model (14) of the first vehicle (1) and a cost function (15), such that the cost function (15) is minimized, wherein the prediction about the future driving behavior of the second vehicle (18) is taken into account as a constraint in the determination of the trajectory.

10. A computer program product (11) for determining a trajectory for a first vehicle (1) under consideration of the driving behavior of a second vehicle (18) traveling ahead of the first vehicle (1), wherein the computer program product (11), when run on a processor unit (3), instructs the processor unit (3) to:
- access speed data of the second vehicle (18), the speed data generated by a sensor (24) of the first vehicle (1), the speed data comprising a temporal sequence of actual speeds of the second vehicle (18) determined by the sensor (24) of the first vehicle (1);
- access a first speed limit value that applies for a first route section (22) on which the second vehicle (18) is traveling;
- access a second speed limit value that applies for a second route section (23) on which the second vehicle (18) will travel in the future;
- generate, from the temporal sequence of the actual speed of the second vehicle (18), a function with respect to time of a relative speed deviation of the actual speed of the second vehicle (18) from the first speed limit value;
- determine a mean relative speed deviation from the function with respect to time of the relative speed deviation;
- create a driving behavior profile of the second vehicle (18) based on the speed data and the mean relative speed deviation;
- make a prediction about the future driving behavior of the second vehicle (18) based on the driving behavior profile of the second vehicle (18) in that a future speed of the second vehicle (18) on the second route section (23) is determined as a function of the mean relative speed deviation and the second speed limit value; and
- determine a trajectory for the first vehicle (1) by executing an MPC algorithm (13), which includes a longitudinal dynamic model (14) of the first vehicle (1) and a cost function (15) to be minimized, such that the cost function (15) is minimized, wherein the prediction about the future driving behavior of the second vehicle (18) is taken into account as a constraint in the determination of the trajectory.

* * * * *